United States Patent [19]
Nakamura

[11] Patent Number: 4,635,132
[45] Date of Patent: Jan. 6, 1987

[54] PRINTER USED FOR A TELEVISION RECEIVER

[75] Inventor: Shunichi Nakamura, Osaka, Japan

[73] Assignee: Mitsubishi Denki Kabushiki Kaisha, Tokyo, Japan

[21] Appl. No.: 617,603

[22] Filed: Jun. 5, 1984

[30] Foreign Application Priority Data

Jun. 8, 1983 [JP] Japan ................. 58-103601

[51] Int. Cl.⁴ .......... H04N 1/21; H04N 1/23; H04N 7/08; H04N 1/32
[52] U.S. Cl. ................. 358/296; 358/142; 358/257; 340/721
[58] Field of Search ........ 358/296, 300–302, 358/257, 258, 298, 264, 134, 78, 142, 146, 177; 340/721, 745

[56] References Cited

U.S. PATENT DOCUMENTS

| 4,051,522 | 9/1977 | Healy et al. | 358/142 X |
| 4,218,710 | 8/1980 | Kashigi et al. | 358/22 X |
| 4,303,940 | 12/1981 | Ciciora | 358/142 |
| 4,317,136 | 2/1982 | Keyt et al. | 358/257 X |
| 4,361,848 | 11/1982 | Poignet et al. | 358/258 X |

Primary Examiner—E. A. Goldberg
Assistant Examiner—Patrick W. Foster
Attorney, Agent, or Firm—Birch, Stewart, Kolasch & Birch

[57] ABSTRACT

An apparatus for selectively printing either character signals or video signals received by a T.V. receiver on a printing medium wherein the character signals or the video signals are selectively transferred to a video memory prior to printing. This enables the transmission of data from a character decoder to be finished in one vertical period, and there is no need to stop the flow of images on the T.V. screen when they are printed.

2 Claims, 1 Drawing Figure

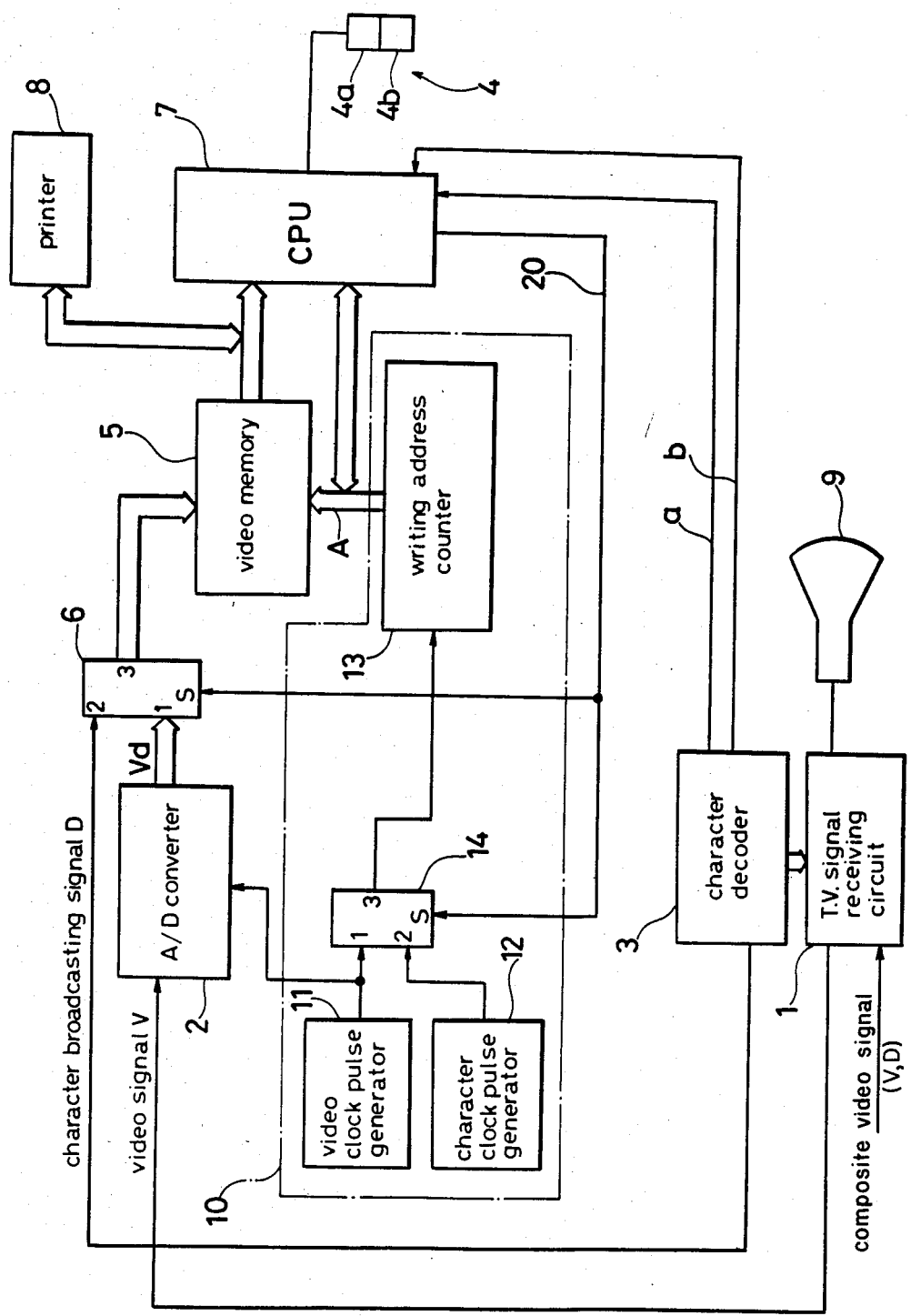

PRINTER USED FOR A TELEVISION RECEIVER

FIELD OF THE INVENTION

The present invention relates to a printer used in association with a television receiver, and more particularly, to a printer for printing out television signals.

BACKGROUND OF THE INVENTION

In general, there are T.V. programs for which the viewers want to record the broadcast information for future reference. For example, in a "How-To-Cook" program the housewives want to record the cooking information on the T.V. screens. However, under the present system of television receivers they have to write it down in their notebooks while watching the T.V. screen. This is very troublesome, and is actually a difficult task because they must catch up with the constant flow of the images on the screen, which go on without considering the viewers' convenience. Recently, videotape recorders have been developed, and it is true that they have solved this problem to a great extent. However, in reproducing the videotape it is neccesary to search and select that part of the tape in which the information wanted by the viewer is recorded. As generally known, the re-playing of selected parts of the tape is time- and labor-consuming, so that housewives are often discouraged from reproducing the videotape in spite of the toil paid by them in recording.

In order to solve the inconvenience mentioned above, the inventor has made an invention which provides a printer for automatically hard-copying the pictures on the T.V. screen by writing the gradation density signals of the T.V. pictures in the RAM at real time, and reading them out.

In addition to the picture broadcasting, it is recently desired that characters also be broadcast on T.V. According to this new type of broadcasting, weather forecasts and news reports are broadcast in characters alone or together with pictures on a CRT tube. In this character broadcasting the transmission of character data is performed by inserting the character data in digital form within the period of time for the vertical blanking of T.V. signals, and at the receiver side the character data is temporarily stored in the memory of a character decoder, in which the data is converted into such signals as to be capable of visual display on the screen of a CRT.

In order to print out the character information by the printer invented by the same inventor, it is necessary to read the character data from the memory in the character decoder by the CPU in the decoder, and to print it out by the printer.

However, the memory in the character decoder has a limitation in its storing ability, that is, the content of the memory is automatically replaced by the next-transmitted data. As a result, to effect the print-out of the character data with the use of the memory in the character decoder and the CPU in the afore-mentioned, manner, the data transmitting speed must slow down considerably so as to allow the printing speed to keep pace therewith. If the next data is written in the memory before the transmission of the former data is finished, it is impossible to print out the characters in a clean, normal manner. To remedy this, it will be necessary not to start the writing of the data until the data to be printed out is completely transmitted. This results in the discontinuity of the pictures.

OBJECTS AND SUMMARY OF THE INVENTION

The present invention is directed to solve the problems pointed out above, and has for its object to provide an improved printer for a television receiver which is capable of switching between video signals and character broadcasting signals so as to print out either of them selectively.

Another object of the present invention is to provide an improved printer capable of printing out character images without stopping the flow of the images on the screen.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to one aspect of the present invention, there is provided a printer used for a television receiver, the printer comprising:

a television signal receiving circuit for taking video signals from composite video signals including picture and character images;

a cathode ray tube for displaying said video signals in a substantially continuous manner as a series of moving images;

an A/D converter for converting the video signals representative of the picture images into gradation density signals;

a character decoder for taking character representative of the character images broadcasting signals from the composite video signals and decoding same;

a copy key for selectively initiating the printing out of either the picture images or the character images;

a video memory for storing the gradation density signals or the character broadcasting signals;

a signal selector for selecting either the gradation density signals from the A/D converter or the character broadcasting signals from the character decoder and delivering the selected signals to the video memory, the selection being initiated by the copy key;

a writing address control circuit for delivering address signals to the video memory so as to enable the gradation density signals or the character broadcasting signals to be written in the video memory, the delivering being initiated by the copy key;

a read-out control circuit for reading out the gradation density signals or the character broadcasting signals stored in the video memory; and a printer for printing out the read-out gradation density signals or the character broadcasting signals without interrupting the series of moving images on the cathode ray tube.

BRIEF DESCRIPTION OF THE DRAWINGS

The drawing is a block diagram illustrating a printer embodying the present invention.

DETAILED DESCRIPTION OF THE PREFERRED EMBODIMENT

Referring to the drawing, the reference numeral 1 designates a T.V. signal receiving circuit which takes video signals (V, D) from composite video signals including video signals V and character broadcasting signals D. The reference numeral 2 designates an A/D converter which converts the video signals V output from the T.V. signal receiving circuit 1 into digital gradation density signals Vd. The reference numeral 3 designates a character decoder which takes character broadcasting signals (V, D) from the composite video signals, and decodes the same for broadcasting. The reference numeral 4 designates a copy key whereby an instruction is given so as to determine that either the pictures or characters should be selected for printing-out, of which the key 4a is for pictures and the key 4b is for characters. The reference numeral 5 designates a video memory in which either of the video gradation density signals Vd or the character broadcasting signals D are stored. The reference numeral 6 designates a first multiplexer (signal selector) which delivers to the video memory 5 either of the gradation density signals Vd from the A/D converter 2 or the character broadcasting signals D from the character decoder 3, in accordance with the instruction of the copy key 4.

The reference numeral 10 designates a writing address control circuit which delivers an address signal A to the video memory 5 at the timings required when either of the gradation density signals Vd or the character broadcasting signals D are written in the video memory 5. The reference numeral 11 designates a video clock pulse generator which generates timing pulses for writing the gradation density signals Vd in the video memory 5. The reference numeral 12 designates a character clock pulse generator which generates timing pulses for writing the character broadcasting signals D in the video memory 5. The reference numeral 13 designates a writing address counter whereby the address signal A is delivered to the video memory 5 at the timings of the output of either of the clock pulse generators 11 or 12. The reference numeral 14 designates a second multiplexer which delivers either of the video clock pulses or character clock pulses to the writing address counter 13 in accordance with the instruction of the copy key 4. The reference numeral 7 designates a CPU (central processing unit) which reads either of the gradation density signals Vd or the character broadcasting signals D in the video memory 5, and outputs a switching control signal 20 whereby either of the first or second multiplexer 6 or 14 is switched over in accordance with the instruction of the copy key 4. The reference numeral 8 designates a printer for printing out either of the gradation density signals Vd or the character broadcasting signals D read out by the CPU 7. The reference numeral 9 designates a CRT (cathode-ray tube) on which either the picture images or the character images selected by a selecting switch (not shown) are provided in the television receiver.

The letters a and b designate display mode signals output from the character decoder 3, the display mode signals being intended to communicate to the CPU which of the picture images or the character images or the multiplexd images thereof are displayed on the screen of the CRT 9.

The operation will be described as follows:

When the television receives the composite video signals, (V, D) they are input to the character decoder 3 and the T.V. signal receiving circuit 1. As a result, the character broadcasting signals D are taken out by the character decoder 3, and the video signals V are taken out by the T.V. signal receiving circuit 1, thereby enabling the picture images or the character images to be represented on the screen of the CRT 9 as selected by the selecting switch, at this stage the character broadcasting signals D are inserted in the form of digital data in the vertical blanking period of the T.V. signals, and the signals D are temporarily stored in the memory within the decoder 3. Subsequently, the signals D are converted into signals capable of visual representation on the CRT 9, and are represented on the screen thereof.

If the viewers want to make a copy of the picture images or the character images appearing on the CRT, they can select either of them by switching on the copy key 4a (for the picture images) or 4b (for the character images).

Now, suppose that the copy key 4a is pressed. In accordance with the instruction from the copy key 4a, the CPU 7 outputs the switching control signals 20 to the first and the second multiplexer 6 and 14 so as to cause the first multiplexer 6 to select the output from the A/D converter 2, and to cause the second multiplexer 14 to select the video clock pulses. Under such conditions the video signals V from the T.V. signal receiving circuit 1 are converted into gradation density signals Vd by the A/D converter 2, which are input to the video memory 5 through the first multiplexer 6. In this case the address control is performed by the writing address counter 13 counting the video clock pulses delivered through the second multiplexer 14, and giving the counted value to the video memory 5 as the address signal A at the timings of the video clock pulses. The gradation density signals Vd which are written in the video memory 5 in this way are read out by the CPU 7, and are printed out by the printer 8.

If the copy key 4b for the character broadcasting is pressed, the CPU 7, in response to the instruction therefrom, outputs the switching control signals 20 which reversely switch the first and the second multiplexers 6 and 14. As a result, the first multiplexer 6 is switched on so as to select the output of the character decoder 3, and the second multiplexer 14 is switched on so as to select the clock pulses for character images. In such a situation the character broadcasting signals D in digital form separated by the character decoder 3, are directly input to the video memory 5 through the first multiplexer 6. In this case the address control is performed by the writing address counter 13 counting the clock pulses for character images, and giving the counted value to the video memory 5 as the address signal A at the timings of the clock pulses. The character broadcasting signals D which are written in the video memory 5 in this way are read out by the CPU 7, and are printed out by the printer 8.

In the illustrated embodiment the video signals and the character broadcasting signals are switched over therebetween, and the selected signals are written in the video memory 5. Therefore, if the T.V. viewer wants to make a copy of either of the picture images or the character images, he has only to print out the content of the video memory 5. This means that a single printer is sufficient for printing out both picture and character images.

The character broadcasting signals are written in the video memory 5, thereby securing an increased operational speed in comparison with that achieved under a system which conducts programmed transmission of the signals with the use of a memory and a CPU in the character decoder 3. In addition, the transmission of data from the character decoder 3 is finished in one vertical period, and there is no need for stopping the flow of images on the screen when they are printed out. Furthermore, the present invention has eliminated the need of writing in and reading out for the print-out within the character decoder 3, which reduces the burden upon the decoder 3, thereby allowing simplified circuits.

As evident from the foregoing description, according to the present invention a single printer having a single memory is sufficient for printing out the picture images or character images as desired. In addition, the circuits of the character decoder can be simplified.

What is claimed is:

1. A printer used for a television receiver, the printer comprising:
    a television signal receiving circuit for taking video signals from composite video signals including picture and character images;
    a cathode ray tube for displaying said video signals in a substantially continuous manner as a series of moving images;
    an A/D converter for converting the video signals representative of the picture images into gradation density signals;
    a character decoder for taking character broadcasting signals representative of the character images from the composite video signals and decoding same;
    a copy key for selectively initiating the printing out of either the picture images or the character images;
    a video memory for storing the gradation density signals or the character broadcasting signals;
    a signal selector for selecting either the gradation density signals from the A/D converter or the character broadcasting signals from the video memory, the selection being initiated by the copy key;
    a writing address control circuit for delivering address signals to the video memory so as to enable the gradation density signals or the character broadcasting signals to be written in the video memory, the delivering being initiated by the copy key;
    a read-out control circuit for reading out the gradation density signals or the character broadcasting signals stored in the video memory; and
    a printer for printing out the read-out gradation density signals or the character broadcasting signals without interrupting the series of moving images on the cathode ray tube.

2. A printer as defined in claim 1, wherein the writing address control circuit comprises a video clock pulse generator which generates timing pulses required to write the gradation density signals in the video memory, a character clock pulse generator which generates timing pulses required to write the character broadcasting signals in the video memory, a multiplexer for selecting the output of either of the video clock pulse generator or the character clock pulse generator in accordance with the instruction provided by the copy key, and a writing address counter which delivers address signals to the video memory at the timings of the timing pulses selected by the multiplexer.

* * * * *